United States Patent
Smith

(10) Patent No.: US 6,647,763 B1
(45) Date of Patent: Nov. 18, 2003

(54) OPTICAL VACUUM LEAK DETECTION DEVICE AND METHOD

(75) Inventor: Paul J. Smith, Silver Spring, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1 day.

(21) Appl. No.: 10/103,747

(22) Filed: Mar. 21, 2002

(51) Int. Cl.[7] ................................................ G01M 3/04
(52) U.S. Cl. ............................................ 73/49.8; 73/46
(58) Field of Search ..................... 250/559.42, 559.4, 250/559.43, 559.39, 239; 73/49.3, 40, 46, 52, 49.8; 340/603–605, 611, 632

(56) References Cited

U.S. PATENT DOCUMENTS

| | | | | |
|---|---|---|---|---|
| 3,949,596 A | * | 4/1976 | Hawk | 73/40.7 |
| 4,002,055 A | * | 1/1977 | Kops | 73/40 |
| 4,053,056 A | * | 10/1977 | Day | 209/587 |
| 4,055,984 A | * | 11/1977 | Marx | 73/40.7 |
| 5,231,867 A | * | 8/1993 | Serwatzky | 73/46 |
| 6,167,751 B1 | * | 1/2001 | Fraim et al. | 73/49.3 |
| 6,460,405 B1 | * | 10/2002 | Mayer et al. | 73/40.7 |
| 6,513,366 B1 | * | 2/2003 | Stauffer | 73/49.3 |

* cited by examiner

Primary Examiner—David Porta
Assistant Examiner—Patrick J. Lee
(74) Attorney, Agent, or Firm—Mark Homer

(57) ABSTRACT

The present invention comprises a device and a method for determining if a system with multiple seals has a leak and, if so, which of the multiple seals is causing said leak. The device and method employ a change in the optical reflectivity of a transparent, plastic membrane due to pulling a vacuum on the seal to make the above mentioned determination.

14 Claims, 1 Drawing Sheet

OPTICAL VACUUM LEAK DETECTION DEVICE AND METHOD

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention pertains to leak detection techniques and devices, more particularly to the use of vacuum tests and devices to detect the presence of leaks, and most particularly to using a vacuum test to detect the presence of leaks and identify the seals where leaks have occurred.

2. Description of the Related Art

Modern weapon systems, such as torpedoes and missiles, are a collection of subassemblies that are housed in shell sections. Individual shell sections are connected together with seals. After final assembly, the currently used methods to verify the integrity of the seals are by pulling a vacuum or conducting a pressure test. Seals are flexible and work by forcing the flexible sealing material into/against the two mating parts. Seals are designed for high internal pressure or high external pressure. Therefore, seals have a direction of use associated with their intended use and should be tested in that direction. For systems with high internal pressure a pressure test is used. In conducting a pressure test once the system has been pressurized an initial internal pressure reading is taken. Then the system is allowed to set for a period of time, usually about 30 minutes, and the internal pressure is again measured and, then, compared with the initial level. Pressure changes that exceed a nominal amount are an indication of a bad seal(s) in the system. The leak rate is a fraction of the pressure applied across the seal. Moderately high pressures are used to quickly indicate small leaks.

For systems with high external pressure (under water systems), the direction of the desired seal requires that test pressure should be greater outside the system than inside. It is impractical to construct large high pressure chambers to surround the system under test.

The only method remaining to verify the integrity of a seal for an underwater weapon is to pull a vacuum inside the weapon. Even if a perfect vacuum is used, only 14.7 psi can be applied across the seal. Leaks can be difficult to detect with this low of a pressure differential. A longer observation time helps to some degree in overcoming this shortfall, but is obviously more cumbersome and costly.

Another problem with both of the tests described above is that even if a leak is detected, this merely indicates that one or more of many seal may have leaked. A modern torpedo may have over a dozen seals that are being tested. A common practice after determining a possible leak condition, is to backfill the cavity on the weapon with a gas at a slight positive pressure to check for the presence of the gas around the individual seals. The gas would escape around the defective seal(s). The gas of choice was FREON 12. Recent regulations have attempted to discourage this practice. Other types of Freon gases are currently being used. However, extremely expensive leak detectors must be employed when using this method.

Therefore, it would be desired to provide a leak detection device and technique that could be used for any type of weapon system that could detect leaks and identify the faulty seal(s) associated with said leaks.

SUMMARY OF THE INVENTION

The present invention comprises a device and a method for determining if a system with multiple seals has a leak and, if so, which of the multiple seals is causing said leak. The device and method employ a change in the optical reflectivity of a transparent, plastic membrane to make the above mentioned determination.

Accordingly, it is an object of this invention to provide a device and method to detect leaks in systems containing seals.

It is a further object of this invention to provide a device and method to detect leaks in systems containing seals that is simple and cost efficient.

A still further object of this invention to provide a device and method to determine the specific seal(s) that is leaking within a system containing multiple seals.

This invention accomplishes these objectives and other needs related to leak detection by providing an optical leak detection device for seals or joints comprising a transparent plastic membrane which is placed around the outer edges of the seal or joint being tested. Adhesive/sealant is applied around the edges in order to ensure that the membrane adheres around the seal or joint and also to form a gap between membrane and the seal or joint. Because the membrane adheres to the adhesive without contacting the seal or joint, the surface of the membrane is optically reflective and possesses a "glossy" look. A means to pull a vacuum is employed on the seal or joint on the side opposite to the membrane. If no leak exists in the seal or joint, the membrane stays in place and the optically reflective surface remains the same. However, if a leak exists, the membrane will be pulled into contact with the seal or joint, removing the gap, and the surface of the membrane becomes optically diffuse. The difference between the optically reflective and optically diffuse surfaces is obvious to the person using the device, and, thereby, one can easily detect a leak. The device and method of the present invention may be applied to seals or joints on a variety of one dimensional and two dimensional curved surfaces in addition to flat surfaces.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENT

The present invention uses two optical principles related to the optical reflectance being a function of the roughness of a surface. The first principle is that a transparent smooth surface is normally optically reflective. For example, when faded paint on a car (which is a rough surface from an optical perspective) is filled by water either through washing or rain, this creates a smooth optical surface, which is optically reflective, causing a glossy look. The second principle is that a transparent rough surface is normally optically diffuse. For example, when "scotch" tape conforms to a surface it becomes rough from an optical standpoint and is optically diffuse, thereby, almost invisible.

The invention, as embodied herein, uses these optical principles to provide a device and method for leak detection that is efficient and cost-effective. In general, the invention is an optical leak detection device for seals or joints. The device comprises a transparent, flexible membrane that is large enough to be placed over the seal or joint to be tested. An adhesive is applied to the edges of the seal or joint in order to hold the membrane in place. The membrane is initially held tightly across the seal or joint by the adhesive, thereby forming a gap between the membrane and the seal or joint. In this configuration, the membrane is smooth, and, therefore is optically reflective. Thus, the membrane will have a glossy look. A means for pulling a vacuum is employed on the side of the seal or joint opposite to that of the membrane. Therefore, if a leak exists in the seal or joint, the membrane will be pulled against the seal or joint, creating a rough, optically diffuse surface.

Figure 1:
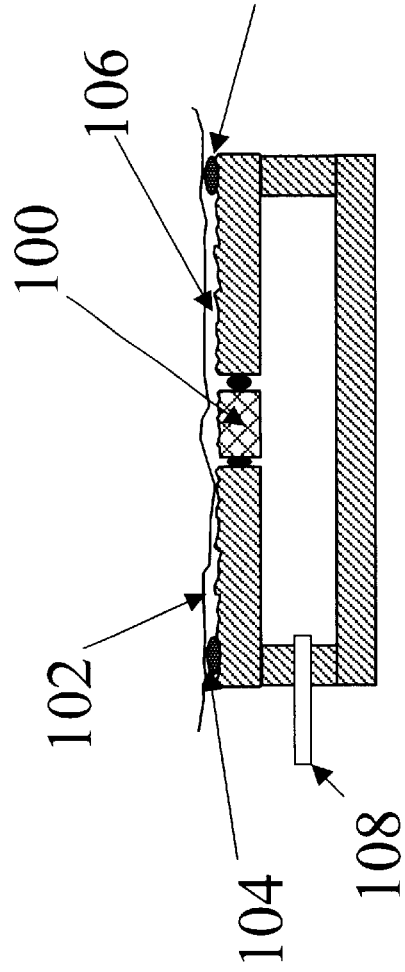
FIG. 1 is a cut-away side view of an embodiment of the invention showing no leak.

Referring to FIG. 1, which shows an embodiment of the invention where no leak is present in the seal 100 being tested, the invention comprises a transparent, flexible membrane 102 that is large enough to completely cover the seal 100. Adhesive 104 is applied to the outer edges of the seal 100 in order to hold the membrane 102 in place and form a gap 106 between the membrane 102 and the seal 100. Because the membrane 102 is stretched across the seal 100, but not in contact with it, the membrane 102 has an optically reflective glossy look. Means for pulling a vacuum 108 is located on the side of the seal 100 opposite to the membrane 102. As seen in this figure, no leak is present and, therefore, the means for pulling a vacuum 108 has no affect upon the membrane 102, and, thus, the membrane 102 retains its optically reflective, glossy look.

Figure 2:
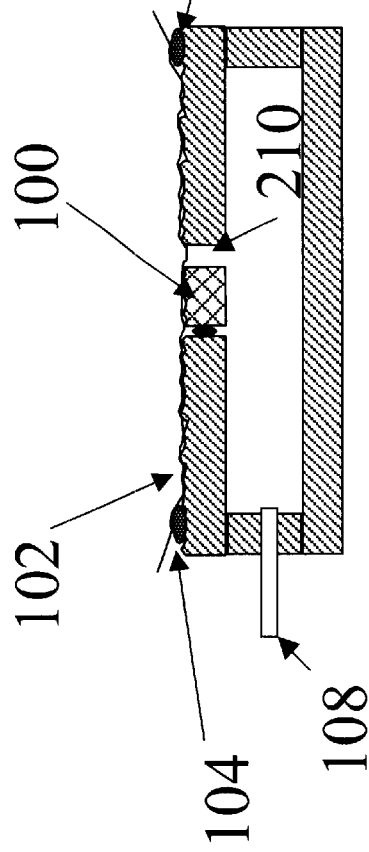
FIG. 2 is a cut-away side view of the embodiment of the invention shown in FIG. 1 showing a leak.

Referring to FIG. 2, the device of FIG. 1 is portrayed with a leak 210 within the seal 100. The membrane 102 is pulled substantially against the seal 100 by the means for pulling a vacuum 108. This causes the membrane 102 to become optically diffuse, thereby becoming dull. Therefore, to an operator using the device, a leaking seal is easily detected by observing the membrane 102.

Figure 3:
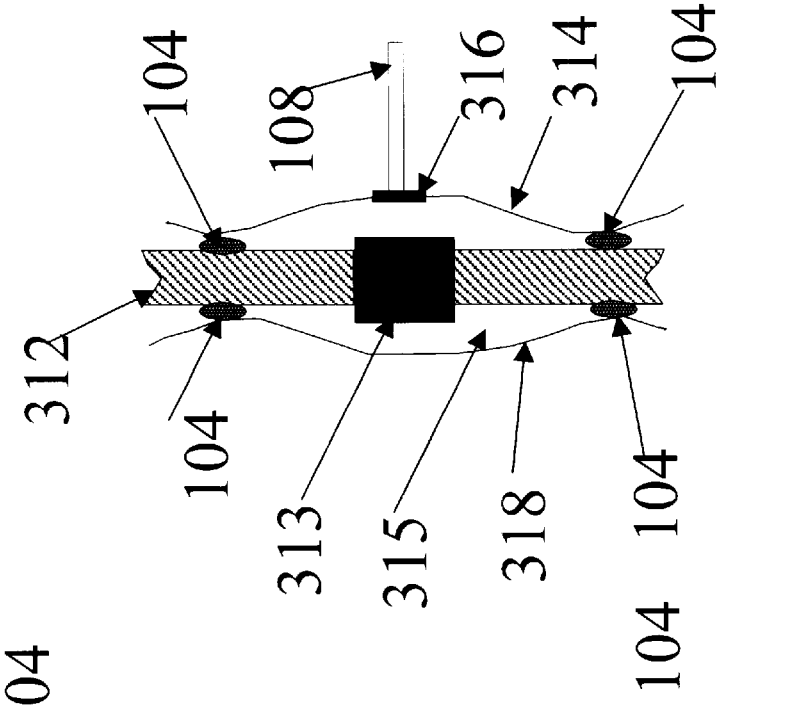
FIG. 3 is a cut-away side view of an embodiment of the invention used on ship hull.

Referring to FIG. 3, an embodiment of the device may also be employed to determine if a leak exists in a seal within an object such as a ship hull 312. Often ship hulls are modified to place an object within the hull 312 such as a water velocity sensor 313. Therefore, the hull must be sealed around the object. In order to detect a leak in the hull 312 using the present invention, a first membrane 314 having a port 316 is placed around one side of the sensor 313. The first membrane 314 is secured using adhesive 104 as described above. A second membrane 318 is placed over the opposite side of the sensor 313, having a gap 315 formed between the second membrane and sensor 313, so that the second membrane 318 is optically reflective with a glossy look. This second membrane 318 is also secured with adhesive 104. A means for pulling a vacuum 108 is connected to the port 316. When a vacuum is pulled using the means for pulling a vacuum 108, and if a leak exists in the seal between 313 and 312, the second membrane will come into direct contact with the hull 312 and sensor 313 and become optically diffuse and dull looking.

One other preferred embodiment of the present invention draw elements from all three of the FIGS. discussed above. If a system operates with a pressure that is higher internally than the ambient pressure, the membrane 102 is placed over the seal 100 and is held by adhesive 104 as shown in FIG. 1. In this embodiment, the membrane 102 is placed directly against the seal 100 so that the membrane 102 is optically diffuse with a dull look. A port 316 is attached to the membrane 102 as shown in FIG. 3. The means for pulling a vacuum 108 is attached to the port 316 as shown in FIG. 3, rather than placed on the side of the seal 100 opposite to the membrane 102. When a vacuum is pulled, if a leak exists, the membrane 102 will rise, forming a gap 106 so that the membrane 102 becomes optically reflective with a glossy look.

Regarding the elements of the device described above, the membrane 102, 314, 318 should comprise a transparent flexible material that is optically reflective when suspended over an object and optically diffuse when in contact with an object. Many such materials are known and may be selected by one skilled in the art. One preferred material is plastic wrap or cellophane because it is flexible, simple to obtain and inexpensive. The adhesive 104 should comprise any substance that can be applied to the edges of a seal 100 and will hold the membrane 102 in place. The adhesive 104 must also provide the gap 106 between the membrane 102 and the seal 100. Therefore, the adhesive 104 should not be a liquid type material, but more of a gel. Again, many such substances are known and may be selected by one skilled in the art. One preferred adhesive 104 is grease because it normally is used in association with seals and joints, so is readily available. The means for pulling a vacuum 108 should provide at least about 10 pounds per square inches of vacuum. Most commercial vacuum pumps are capable of providing this vacuum, and, therefore, one skilled in the art may select any such vacuum pump.

Finally, the present invention also comprises a method of detecting leaks in a seal or joint using the different embodiments of the device as described above. The general steps of the method include the following. First, one would apply adhesive to outer edges of the seal or joint. Next, the membrane is placed over the seal or joint so it is held in place by the adhesive, and a gap is formed between the membrane and the seal or joint. In this configuration, the membrane comprises a reflective surface. Next, a vacuum is pulled on a side of the seal or joint opposite to the membrane. If a leak exists in the seal or joint, the membrane will directly contact the seal or joint, removing the gap, so that the membrane comprises an optically diffuse surface.

What is described are specific examples of many possible variations on the same invention and are not intended in a limiting sense. The claimed invention can be practiced using other variations not specifically described above.

What is claimed is:

1. An optical leak detection device for seals or joints, comprising:
   an adhesive applied to outer edges of the seal or joint;
   at least one transparent, flexible membrane, having a size larger than the seal or joint, placed over the seal or joint, held in place by the adhesive, forming a gap therein and,
   means to pull a vacuum on a side of the seal or joint opposite to the membrane, wherein pulling a vacuum when no leak in the seal or joint exists results in no movement of the membrane and when a leak in the seal or joint exists results in the membrane directly contacting the seal or joint.

2. The optical leak detection device of claim 1, wherein the transparent, flexible membrane comprises cellophane.

3. The optical leak detection device of claim 2, wherein the adhesive comprises grease.

4. The optical leak detection device of claim 3, wherein the means to pull a vacuum pulls at least about 10 pounds per square inches of vacuum.

5. The optical leak detection device of claim 3, further comprising:
- a second transparent, flexible membrane placed between the means to pull a vacuum and the seal or joint, having a vacuum port therein to attach the vacuum to the second membrane.

6. The optical leak detection device of claim 5, wherein the second transparent, flexible membrane comprises cellophane.

7. A method for detecting leaks in a seal or joint, comprising the steps of:
- applying adhesive to outer edges of a side of the seal or joint;
- placing a transparent, flexible membrane over the seal or joint so it is held in place by the adhesive, forming a gap between the membrane and the seal or joint;
- pulling a vacuum on a side of the seal or joint opposite to the membrane, wherein no leak in the seal or joint results in no movement by the membrane and a leak in the seal or joint results in the membrane directly contacting the seal or joint.

8. The method of claim 7, wherein the membrane comprises cellophane.

9. The method of claim 8, wherein the adhesive comprises grease.

10. The method of claim 9, further comprising the steps of:
- applying adhesive to outer edges of a side of the seal or joint opposite to the membrane:
- providing a second transparent, flexible membrane over the seal or joint, on a side opposite to the membrane, so it is held in place by the adhesive, forming a gap between the second membrane and the seal or joint; and,
- providing a vacuum port on the second membrane to attach a vacuum.

11. The method of claim 10, wherein the second transparent, flexible membrane comprises cellophane.

12. An optical leak detection device for seals or joints in devices having an internal pressure higher than ambient pressure, comprising:
- at least one transparent, flexible membrane, having a size larger than the seal or joint, placed over and contacting the seal or joint;
- a vacuum port on the transparent, flexible membrane; and,
- means to pull a vacuum connected to the vacuum port wherein pulling a vacuum when no leak in the seal or joint exists results in no movement of the membrane and when a leak in the seal or joint exists results in the membrane lifting away from the seal or joint, forming a gap between the membrane and the seal or joint.

13. The optical leak detection device of claim 12, wherein the transparent, plastic membrane comprises cellophane.

14. The optical leak detection device of claim 13, wherein the adhesive comprises grease.

* * * * *